(12) United States Patent
Yu

(10) Patent No.: US 10,447,120 B2
(45) Date of Patent: Oct. 15, 2019

(54) MOTOR, GIMBAL AND MECHANICAL ARM HAVING SAME

(71) Applicant: AUTEL ROBOTICS CO., LTD., Shenzhen, Guangdong (CN)

(72) Inventor: Chun Yu, Guangdong (CN)

(*) Notice: Subject to any disclaimer, the term of this patent is extended or adjusted under 35 U.S.C. 154(b) by 0 days.

(21) Appl. No.: 16/126,398

(22) Filed: Sep. 10, 2018

(65) Prior Publication Data
US 2019/0020245 A1 Jan. 17, 2019

Related U.S. Application Data

(63) Continuation-in-part of application No. PCT/CN2018/083762, filed on Apr. 19, 2018.

(30) Foreign Application Priority Data

Jul. 17, 2017 (CN) .................. 2017 2 0866701 U

(51) Int. Cl.
*H02K 11/215* (2016.01)
*H02K 11/30* (2016.01)
*G03B 15/00* (2006.01)
*G03B 17/56* (2006.01)
*F16M 11/10* (2006.01)
(Continued)

(52) U.S. Cl.
CPC ............ *H02K 11/215* (2016.01); *F16H 1/06* (2013.01); *F16H 19/04* (2013.01); *F16M 11/105* (2013.01); *F16M 11/2064* (2013.01); *G03B 15/006* (2013.01); *G03B 17/561* (2013.01);
(Continued)

(58) Field of Classification Search
None
See application file for complete search history.

(56) References Cited

U.S. PATENT DOCUMENTS 4,668,884 A * 5/1987 Amao .................. H02K 29/08
310/156.05
5,392,176 A * 2/1995 Anderson .......... G11B 19/2009
310/156.34
(Continued)

FOREIGN PATENT DOCUMENTS

CN 2475218 Y 1/2002
CN 106787277 A 5/2017
(Continued)

*Primary Examiner* — William B Perkey

(57) ABSTRACT

The present invention relates to the field of motor technologies, and provides a motor, a gimbal and a mechanical arm having same. The motor includes a rotary shaft, a first magnetic element, a first circuit board and a second circuit board. The first magnetic element is mounted on the rotary shaft and is capable of rotating with the rotary shaft. The first circuit board is mounted on the rotary shaft and disposed opposite to the first magnetic element. The first circuit board includes a coil circuit and the coil circuit faces toward the first magnetic element. The second circuit board is mounted on the rotary shaft, the second circuit board including an electronic speed control circuit, the second circuit board being electrically connected to the first circuit board. In the motor in the present invention, the second circuit board including the electronic speed control circuit is mounted on the rotary shaft, so that space of the motor can be properly used, thereby making a structure of the motor compact.

16 Claims, 6 Drawing Sheets

(51) Int. Cl.
*F16M 11/20* (2006.01)
*F16H 1/06* (2006.01)
*F16H 19/04* (2006.01)

(52) U.S. Cl.
CPC .......... *H02K 11/30* (2016.01); *H02K 2211/03* (2013.01)

(56) References Cited

U.S. PATENT DOCUMENTS

| | | | | |
|---|---|---|---|---|
| 5,610,459 | A * | 3/1997 | Izawa | H02K 11/33 310/68 D |
| 2006/0078347 | A1* | 4/2006 | Park | G03G 15/0121 399/90 |
| 2019/0020245 | A1* | 1/2019 | Yu | H02K 11/215 |

FOREIGN PATENT DOCUMENTS

| | | |
|---|---|---|
| CN | 106787293 A | 5/2017 |
| CN | 106787463 A | 5/2017 |
| CN | 206180786 U | 5/2017 |
| CN | 206948130 U | 1/2018 |
| JP | 2013-183554 A | 9/2013 |

* cited by examiner

MOTOR, GIMBAL AND MECHANICAL ARM HAVING SAME

CROSS REFERENCE

The present application is a continuation in part of International Invention NO. PCT/CN2018/083762, filed on Apr. 19, 2018, which claims priority to Chinese Patent Application No. 201720866701.2, filed on Jul. 17, 2017 and entitled "MOTOR, GIMBAL AND MECHANICAL ARM HAVING THE SAME", both of which are incorporated herein by reference in their entireties.

BACKGROUND

Technical Field

The present invention relates to the field of motor technologies, and in particular, to a motor, a gimbal and a mechanical arm having same.

Related Art

Motor products are widely applied to fields such as electronic device, numerical control machine tool, carving machine, laser device, packing machinery, medical device and automation equipment, such as a gimbal of an unmanned aerial vehicle and a mechanical arm of a robot.

However, for most currently used motors, a motor rotation angle is detected by using a linear Hall element. This type of motor has the following disadvantages: 1. An angle detected by the linear Hall element has a large error. 2. The arrangement of the linear Hall element on a winding circuit board increases the area of the winding circuit board, leading to an increased size of the entire motor.

SUMMARY

To resolve the foregoing technical problems, embodiments of the present invention provide a motor of a compact structure, a gimbal and a mechanical arm having same.

To resolve the foregoing technical problems, the embodiments of the present invention provide the following technical solution:

A motor, comprising:
a rotary shaft;
a first magnetic element, where the first magnetic element is mounted on the rotary shaft and is capable of rotating with the rotary shaft;
a first circuit board, where the first circuit board is mounted on the rotary shaft and disposed close to the first magnetic element, the first circuit board being opposite to the first magnetic element, the first circuit board being provided with a coil circuit, and the coil circuit being disposed on a surface of the first circuit board facing toward the first magnetic element; and
a second circuit board, where the second circuit board is mounted on the rotary shaft and disposed far away from the first magnetic element, the second circuit board being provided with an electronic speed control circuit, the second circuit board being electrically connected to the first circuit board.

In some embodiments of the present invention, the motor further comprises a first supporting seat sleeved on the rotary shaft, the first supporting seat being capable of rotating with the rotary shaft, where the first magnetic element is disposed on the first supporting seat.

In some embodiments of the present invention, where the first supporting seat comprises an annular protrude disposed on a middle portion of the first supporting seat, the first magnetic element being sleeved on the annular protrude and connected to the first supporting seat.

In some embodiments of the present invention, the motor further comprises a second supporting seat mounted on the rotary shaft by using a bearing, where the first circuit board is mounted on the second supporting seat and connected to the second supporting seat.

In some embodiments of the present invention, the motor further comprises a yoke used for preventing a magnetic line of the first magnetic element diffusing to the second supporting seat, where the yoke is disposed on a surface of the second supporting seat facing to the first magnetic element and sandwiched between the first circuit board and the second supporting seat.

In some embodiments of the present invention, where the second circuit board is mounted on the second supporting seat and connected to the second supporting seat, the first circuit board and the second circuit board being disposed on two sides of the second supporting seat respectively.

In some embodiments of the present invention, where the first circuit board comprises a substrate, the coil circuit being disposed on a surface of the substrate facing to the first magnetic element.

In some embodiments of the present invention, where the coil circuit comprises a plurality of rectilinear circuits extending along a radial direction of the first circuit board and arc circuits electrically connected to the plurality of rectilinear circuits, the arc circuits connect the plurality of rectilinear circuits in series to form a phase winding of the motor.

In some embodiments of the present invention, the motor further comprises a second magnetic element, the second magnetic element being mounted on the rotary shaft and being capable of rotating with the rotary shaft, where the second circuit board is sleeved on the second magnetic element and the second circuit board is provided with a magnetic encoder for detecting a magnetic field change of the second magnetic element.

In some embodiments of the present invention, where the magnetic encoder is disposed close to the second magnetic element, an end face of the magnetic encoder far away from the second circuit board and an end face of the second magnetic element far away from the first magnetic element are on a same plane.

In some embodiments of the present invention, where the second magnetic element and the first magnetic element are disposed on two ends of the rotary shaft respectively.

In some embodiments of the present invention, the motor further comprises a nut disposed on an end of the rotary shaft, where the second magnetic element is sleeved on the nut and connected to the nut.

To resolve foregoing technical problems, the present invention further provides a gimbal, comprising:
a shooting apparatus;
a first motor used for driving the shooting apparatus rotating about a yaw axis, the first motor comprising a first stator and a first rotator connected to the first stator, the first rotator being capable of rotating relative to the first stator;
a second motor used for driving the shooting apparatus rotating about a pitch axis, the second motor comprising a second stator and a second rotator connected to the second stator, the second rotator being capable of rotating relative to the second stator;

a first connecting arm, one end of the first connecting arm being connected to the first rotator and the other end of the first connecting arm being connected to the second stator;

a third motor used for driving the shooting apparatus rotating about a roll axis, the third motor comprising a third stator and a third rotator connected to the third stator, the third rotator being capable of rotating relative to the third stator; and a second connecting arm, one end of the second connecting arm being connected to the second rotator and the other end of the second connecting arm being connected to the third stator;

where the shooting apparatus is connected to the third rotator;

where at least one of the first motor, the second motor and the third motor comprises:

a rotary shaft;

a first magnetic element, wherein the first magnetic element is mounted on the rotary shaft and is capable of rotating with the rotary shaft;

a first circuit board, wherein the first circuit board is mounted on the rotary shaft and disposed close to the first magnetic element, the first circuit board being opposite to the first magnetic element, the first circuit board being provided with a coil circuit, and the coil circuit being disposed on a surface of the first circuit board facing toward the first magnetic element; and a second circuit board, wherein the second circuit board is mounted on the rotary shaft and disposed far away from the first magnetic element, the second circuit board being provided with an electronic speed control circuit, the second circuit board being electrically connected to the first circuit board.

To resolve foregoing technical problems, the present invention further provides a mechanical arm, comprising:

a first rotary arm;

a motor, the motor being connected to the first rotary arm;

a driving mechanism, the driving mechanism being connected to the motor; and a second rotary arm, the second rotary arm being connected to the driving mechanism;

the driving mechanism being used for transforming a rotation of the motor to a moving of the second rotary arm relative to the first rotary arm;

wherein the motor comprises:

a rotary shaft;

a first magnetic element, wherein the first magnetic element is mounted on the rotary shaft and is capable of rotating with the rotary shaft;

a first circuit board, wherein the first circuit board is mounted on the rotary shaft and disposed close to the first magnetic element, the first circuit board being opposite to the first magnetic element, the first circuit board being provided with a coil circuit, and the coil circuit being disposed on a surface of the first circuit board facing toward the first magnetic element; and a second circuit board, wherein the second circuit board is mounted on the rotary shaft and disposed far away from the first magnetic element, the second circuit board being provided with an electronic speed control circuit, the second circuit board being electrically connected to the first circuit board.

In some embodiments of the present invention, where the driving mechanism comprises a drive gear connected to a rotator of the motor and a driven gear engaging with the drive gear, the driven gear being connected to the second rotary arm.

In some embodiments of the present invention, where the driven gear is a circular gear or a rack.

Compared with the prior art, the second circuit board having the electronic speed control circuit is mounted on the rotary shaft, so that space of the motor can be properly used, thereby making a structure of the motor more compact.

In addition, the magnetic encoder is disposed on the second circuit board, and an rotation angle of the motor is detected by using the magnetic encoder and the second magnetic element, so that the detection precision can be improved while avoiding use of a linear Hall element, thereby making the structure of the motor more compact.

BRIEF DESCRIPTION OF THE DRAWINGS

One or more embodiments are exemplarily described by using figures in accompanying drawings corresponding to the embodiments. These exemplary descriptions do not constitute a limitation on the embodiments, and components that are in the accompanying drawings and that have same reference numbers represent similar components. Unless otherwise stated, the figures in the accompanying drawings do not constitute a proportion limitation.

DETAILED DESCRIPTION

For ease of understanding the present invention, the present invention is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Directions and location relationships indicated by terms such as "upper", "lower", "inner", "outer" and "bottom" used in this specification are based on directions and location relationships shown in the accompanying drawings, and are only for ease of describing the present invention and simplifying descriptions, but do not indicate or imply that an apparatus or an element needs to have a particular direction or be constructed and operated in a particular direction; and therefore cannot be construed as a limitation on the present invention. In addition, terms such as "first", "second" and "third" are used only for the purpose of description, and cannot be understood as indicating or implying relative importance.

Unless otherwise defined, meanings of all technical and scientific terms used in this specification are the same as those usually understood by persons skilled in the technical field to which the present invention belongs. The terms used in this specification of the present invention are merely intended to describe specific implementations rather than limit the present invention. A term "and/or" used in this specification includes any or all combinations of one or more related listed items.

In addition, the following technical features in different embodiments of the present invention may be mutually combined provided that the technical features do not conflict with each other.

Figure 1:
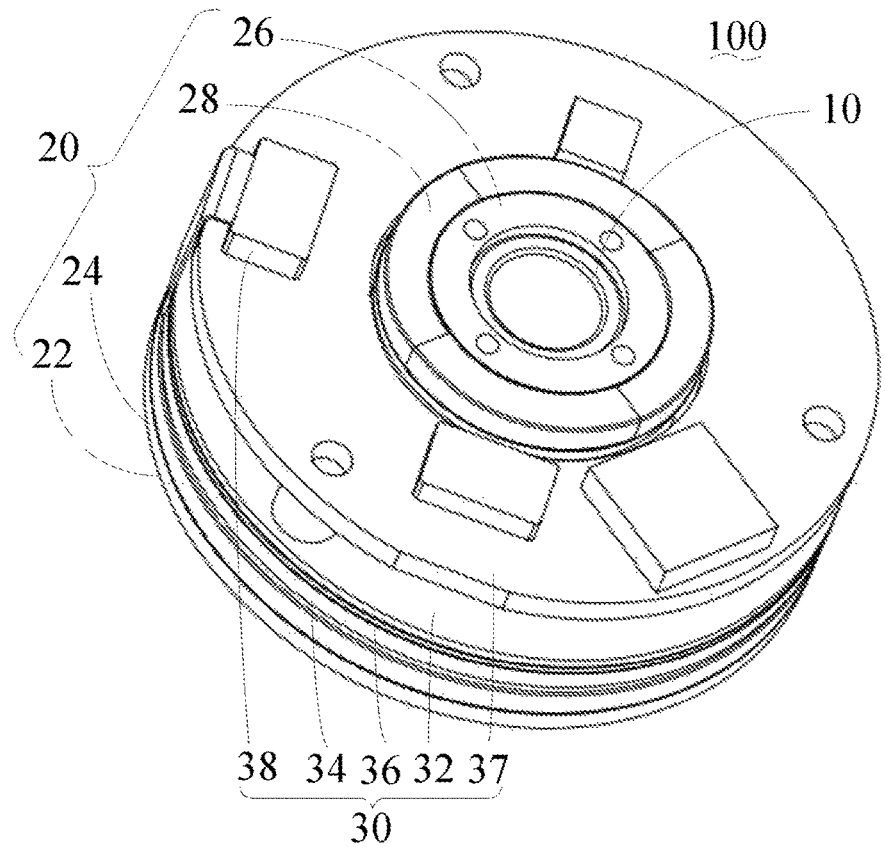
FIG. 1 is a simplified three-dimensional view of a motor according to an embodiment of the present invention.
Figure 2:
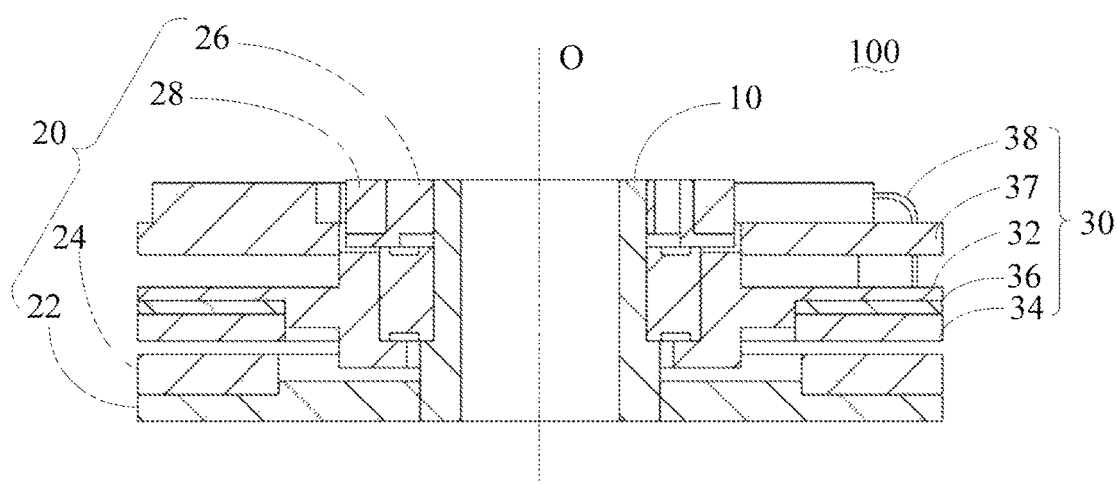
FIG. 2 is a sectional view of the motor shown in FIG. 1.
Figure 3:
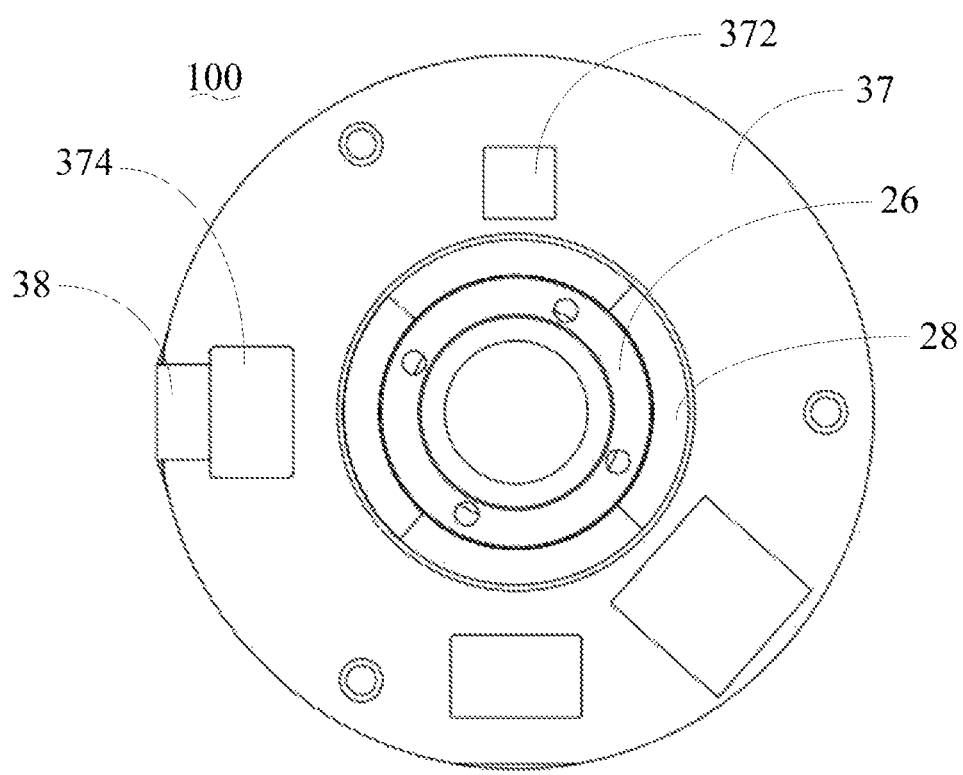
FIG. 3 is a top view of the motor shown in FIG. 1.

Referring to FIG. 1 to FIG. 3, an embodiment of the present invention provides a motor 100, including a rotary shaft 10, a stator subassembly 20 and a rotator subassembly 30. Both the stator subassembly 20 and the rotator subassembly 30 are mounted on the rotary shaft 10. The stator subassembly 20 is mounted on the rotary shaft 10 by using a bearing. The rotator subassembly 30 is fixed with the rotary shaft 10 and is capable of rotating about a central axis O of the rotary shaft 10 relative to the stator subassembly 20. In other possible embodiments, the stator subassembly may be fixed with the rotary shaft and the rotator subassembly may be mounted on the rotary shaft by using a bearing so that the stator subassembly is capable of rotating with the rotary shaft relative to the rotator subassembly.

The rotary shaft 10 is roughly a hollow cylinder. It may be understood that, in some other embodiments, the rotary shaft 10 may be a solid cylinder.

Figure 4:
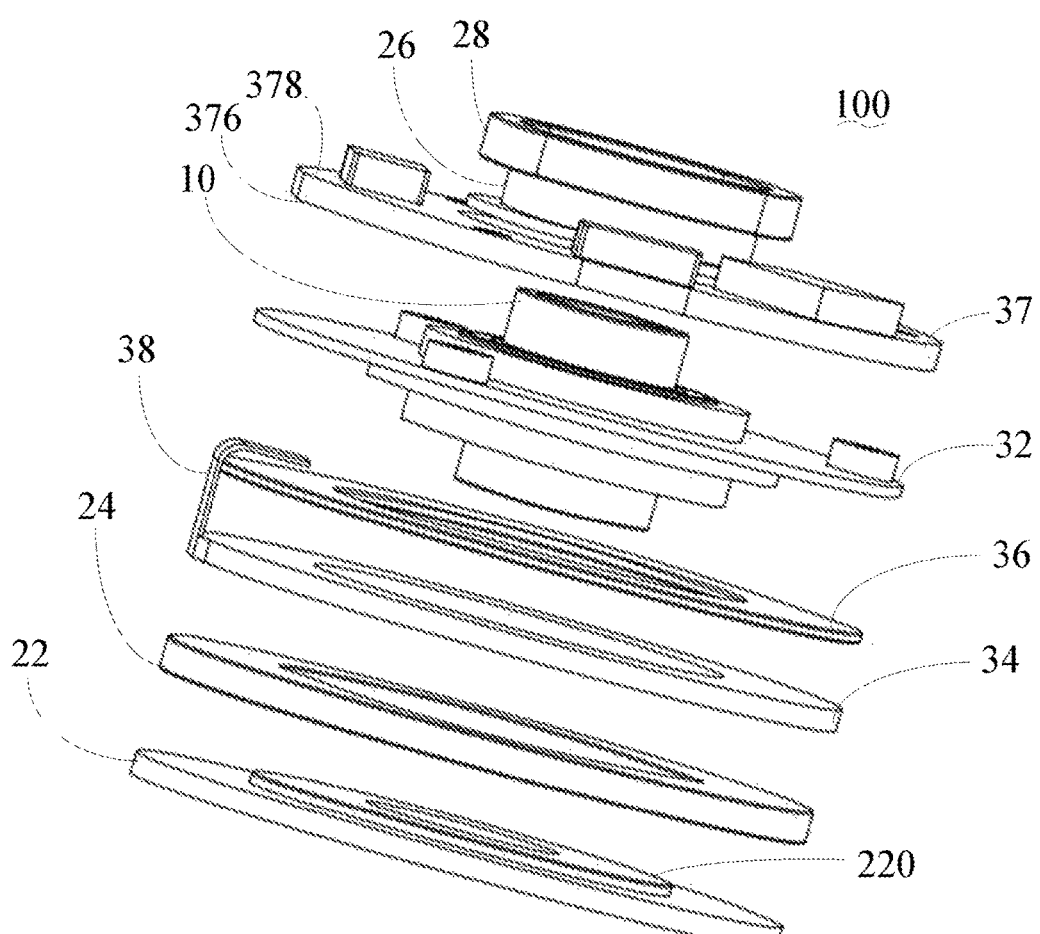
FIG. 4 is an exploded view of the motor shown in FIG. 1.

Referring to FIG. 4, the stator subassembly 20 includes a first supporting seat 22, a first magnetic element 24, a nut 26 and a second magnetic element 28.

The first supporting seat 22 is annular, the first supporting seat 22 being sleeved on the rotary shaft 10 and fixedly mounted on an end of the rotary shaft 10. The first supporting seat 22 includes an annular protrude 220 disposed on a middle portion of the first supporting seat 22.

The first magnetic element 24 is annular, the first magnetic element 24 being fixedly mounted on the first supporting seat 22 and sleeved on the annular protrude 220. The first magnetic element 24 may be made of a permanent magnetic material. It may be understood that, in some other embodiments, the first supporting seat 22 may be omitted and the first magnetic element 24 may be directly fixedly mounted on the rotary shaft 10.

The nut 26 is sleeved on the rotary shaft 10 and fixedly mounted on the other end of the rotary shaft 10. In this embodiment, the nut 26 and the first supporting seat 22 are respectively disposed at two ends of the rotary shaft 10.

The second magnetic element 28 is annular, the second magnetic element 28 being sleeved on the nut 26 and fixedly mounted on the nut 26. The second magnetic element 28 may be made of a permanent magnetic material. A main magnetic field of the second magnetic element 28 may be axial, or may be radial. It may be understood that, in some other embodiments, the nut 26 may be omitted; and the second magnetic element 28 may be directly fixedly mounted on the rotary shaft 10.

In this embodiment, the first supporting seat 22 and the nut 26 are fixedly mounted on the rotary shaft 10, so that when rotating, the rotary shaft 10 can drive the first supporting seat 22, the first magnetic element 24, the nut 26 and the second magnetic element 28 to rotate at the same time.

The rotator subassembly 30 includes a second supporting seat 32, a first circuit board 34, a magnetic yoke 36, a second circuit board 37 and a connection line 38.

The second supporting seat 32 is annular, the second supporting seat 32 being sleeved on the rotary shaft 10 and mounted on the rotary shaft 10 by using a bearing. Therefore, when the rotary rotates, the second supporting seat 32 stays still.

The first circuit board 34 is annular, the first circuit board 34 being sleeved on the second supporting seat 32 and fixedly mounted on the second supporting seat 32. The first circuit board 34 is a printed circuit board, the second circuit board 34 including a drive control circuit, a coil circuit and the like.

The magnetic yoke 36 is annular, the magnetic yoke 36 being sleeved on the second supporting seat 32 and fixedly mounted on the second supporting seat 32. The magnetic yoke 36 is sandwiched between the first circuit board 34 and the second supporting seat 32. The magnetic yoke 36 being configured to prevent a magnetic line of the first magnetic element 24 from diffusing to the second supporting seat 32, to increase utilization of the magnetic line of the first magnetic element 24. The first circuit board 34 and the first magnetic element 24 being disposed adjacent to each other with a predetermined distance.

The second circuit board 37 is annular and disposed far away from the first magnetic element 24, the second circuit board 37 being sleeved on the second supporting seat 32 and fixedly mounted on the second supporting seat 32. The second circuit board 37 and the first circuit board 34 are respectively disposed on two sides of the second supporting seat 32. The second circuit board 37 includes a detection circuit, an electronic speed control circuit, a magnetic encoder 372 and a connector 374. The detection circuit is electrically connected to the electronic speed control circuit and the magnetic encoder 372. The first circuit board 34 and the connector 374 is electrically connected with each other by using the connection line 38, so that the second circuit board 37 is electrically connected to the first circuit board 34. The magnetic encoder 372 is configured to detect a change of a magnetic field of the second magnetic element 28 and disposed close to the second magnetic element 28.

The second circuit board 37 is a flexible printed circuit board. The second circuit board 37 includes a first surface 376 and a second surface 378 opposite to the first surface 376. The first surface 376 faces toward the second supporting seat 32, and the second surface 378 faces away from the second supporting seat 32. Both the magnetic encoder 372 and the connector 374 are mounted on the second surface 378. The magnetic encoder 372 is close to the second magnetic element 28. An end face of the magnetic encoder far away from the second circuit board 37 and an end face of the second magnetic element 28 far away from the first magnetic element 24 are on a same plane.

In this embodiment, the first supporting seat 22, the first magnetic element 24, the second supporting seat 32, the first circuit board 34, the magnetic yoke 36 and the second circuit board 37 have a same external diameter.

It may be understood that, in some embodiments, the second supporting seat 32 and the magnetic yoke 36 may be omitted. The first circuit board 34 and the second circuit board 37 may be respectively mounted directly on the rotary shaft 10 by using bearings.

Figure 5:
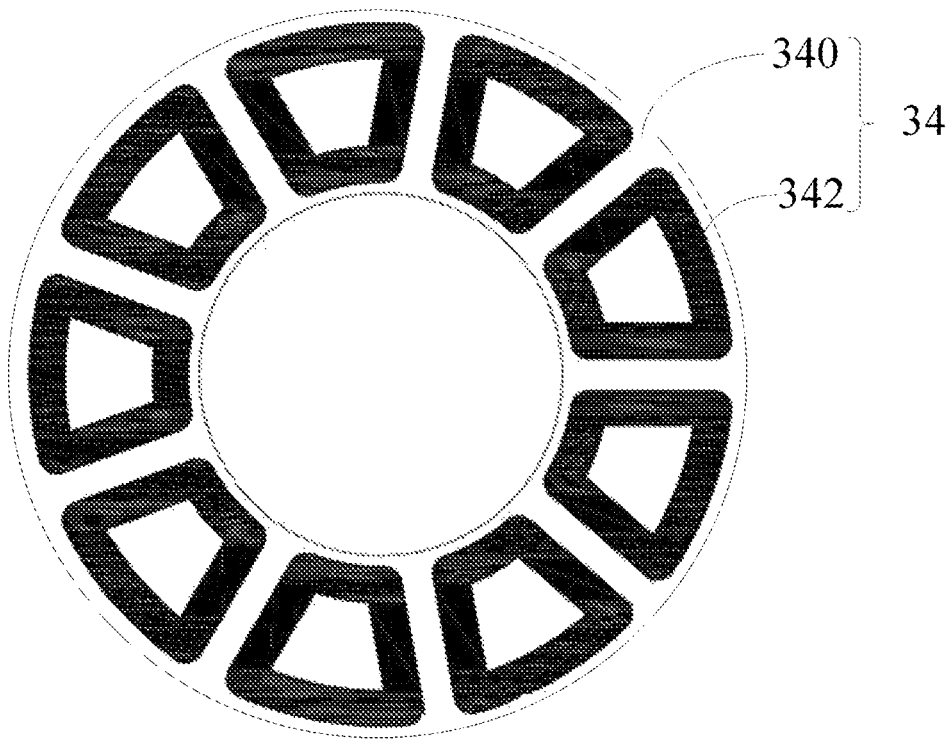
FIG. 5 is a schematic structural diagram of a first circuit board of the motor shown in FIG. 1.
Figure 6:
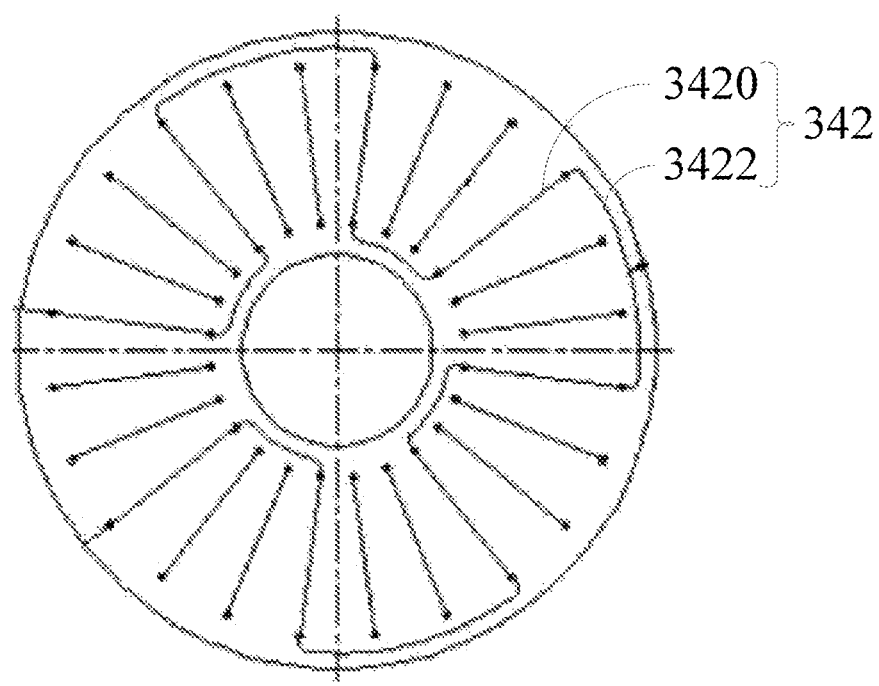
FIG. 6 is a schematic diagram of a coil circuit of the first circuit board shown in FIG. 5.

Referring to FIG. 5 and FIG. 6, in some embodiments, the first circuit board 34 is a flexible printed circuit board, the first circuit board 34 including a substrate 340 and a coil circuit 342, and the coil circuit 342 being disposed on the substrate 340 and facing toward the first magnetic element 24. The coil circuit 342 includes a rectilinear circuit 3420 and an arc circuit 3422. Specifically, one or more layers of radially radiated rectilinear circuits 3420 are embedded by copper clad corrosion. Then, the radial rectilinear circuits 3420 are successively connected in series by using the arc circuit 3422, to form a one-phase winding. Windings of various phases are further interconnected (for example, by using a star connection method or a triangle connection method) by using the arc circuit 3422, to form the coil circuit 342 in this embodiment. This type of winding structure can reduce a weight of the first circuit board 34, thereby reducing rotary inertia of the first circuit board 34. In this embodiment, the coil circuit 342 includes a three-phase winding, windings of various phases being connected in series by using the arc circuit 3422. It may be understood that, in some other embodiments, the coil circuit 342 may be designed as a single-phase winding, a two-phase winding or the like according to an actual requirement.

Figure 7:
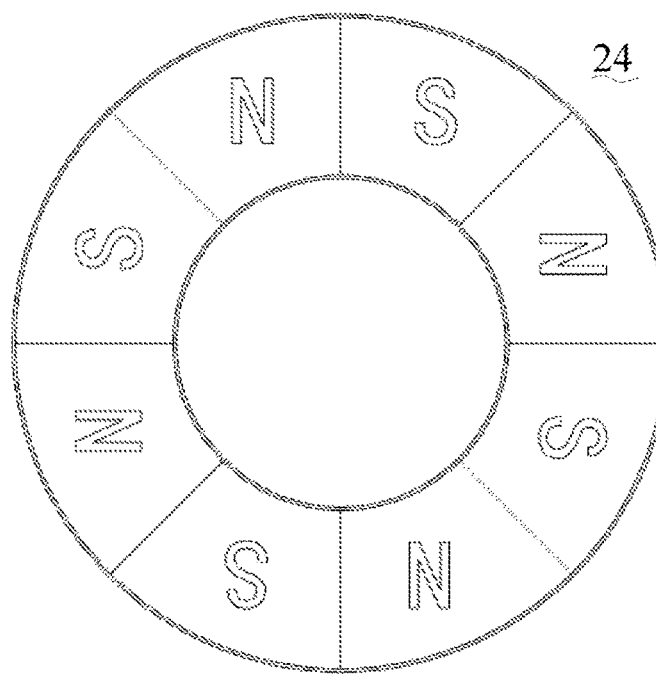
FIG. 7 is a schematic structural diagram of a first magnetic element of the motor shown in FIG. 1.

Referring to FIG. 7, in some embodiments, the first magnetic element 24 adopts a Halbach array axial magnetization structure, which may be a one-piece structure or may be a plurality of magnets arranged in a Halbach array, and provides an axial magnetic field to the coil circuit 342 of the first circuit board 34. It may be understood that, in some other embodiments, the first magnetic element 24 may alternatively adopt another axial magnetization structure.

In the motor 100 in the present invention, the second circuit board 37 including the electronic speed control circuit is annular and mounted on the rotary shaft 10, so that space of the motor 100 can be properly used, thereby making a structure of the motor 100 compact. In addition, the magnetic encoder 372 is disposed on the second circuit board 37, an rotation angle of the motor 100 being detected by using the magnetic encoder 372 and the second magnetic element 28, so that the detection precision can be improved while avoiding use of a linear Hall element, thereby making the structure of the motor 100 more compact.

Figure 8:
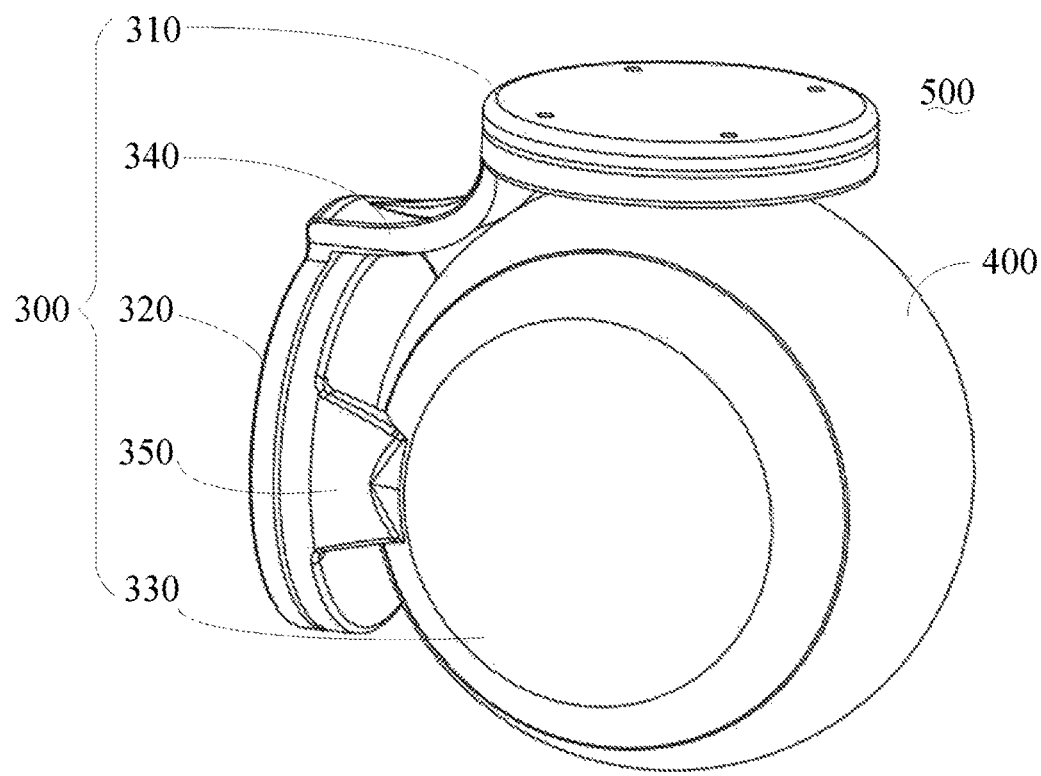
FIG. 8 is a three-dimensional view of a camera subassembly according to an embodiment of the present invention.

Referring to FIG. 8, an embodiment of the present invention provides a camera subassembly 500, including a gimbal 300 and a shooting apparatus 400 carried on the gimbal 300. The gimbal 300 carries the shooting apparatus 400, to realize fastening the shooting apparatus 400 or randomly adjusting a posture of the shooting apparatus 400 (for example, change a height, a tilt angle and/or a direction of the shooting apparatus 400) and keeping the shooting apparatus 400 stable in a specified posture. The camera subassembly 500 may be mounted on an unmanned aerial vehicle, to perform aerial photographing work. Alternatively, the camera subassembly 500 may be mounted on a handle to perform work such as picture shooting or video recording as a handheld shooting device; and a user is allowed to manually operate the gimbal 300 to control a shooting angle of the shooting apparatus 400.

The gimbal 300 is a full range and three-axis gimbal, the gimbal 300 including a first motor 310, a second motor 320, a third motor 330, a first connecting arm 340 and a second connecting arm 350. The first motor 310 is mounted on a body of the unmanned aerial vehicle. The first motor 310 is connected to the second motor 320 by using the first connecting arm 340. The third motor 330 is connected to the second motor 320 by using the second connecting arm 350. The third motor 330 carries the shooting apparatus 400.

Specifically, the first motor 310 includes a first stator and a first rotator connected to the first stator, the first rotator being capable of rotating relative to the first stator. The second motor 320 includes a second stator and a second rotator connected to the second stator, the second rotator being capable of rotating relative to the second stator. The third motor 330 includes a third stator and a third rotator connected to the third stator, the third rotator being capable of rotating relative to the third stator. One end of the first connecting arm 340 is connected to the first rotator of the first motor 310 and the other end of the first connecting arm 340 is connected to the second stator of the second motor 320. One end of the second connecting arm 350 is connected to the second rotator of the second motor 320 and the other end of the connecting arm 350 is connected to the third stator of the third motor 330. The shooting apparatus 400 is connected to the third rotator of the third motor 330.

The first motor 310 is configured to drive the shooting apparatus 400 to rotate about a yaw axis. The second motor 320 is configured to drive the shooting apparatus 400 to rotate about a pitch axis. The third motor 330 is configured to drive the shooting apparatus 400 to rotate about a roll axis. The yaw axis is perpendicular to the pitch axis and the roll axis. The pitch axis is perpendicular to the roll rotation axis. The yaw axis, the pitch axis and the roll axis intersect at one point.

It may be understood that, in some other embodiments, the gimbal 300 may include only the first motor 310 and the second motor 320. The first motor 310 is mounted on the body of the unmanned aerial vehicle. The first motor 310 is connected to the second motor 320. In addition, the second motor 320 carries the shooting apparatus 400.

At least one of the first motor 310, the second motor 320 and the third motor 330 is the motor 100 described in the foregoing embodiments.

Figure 9:
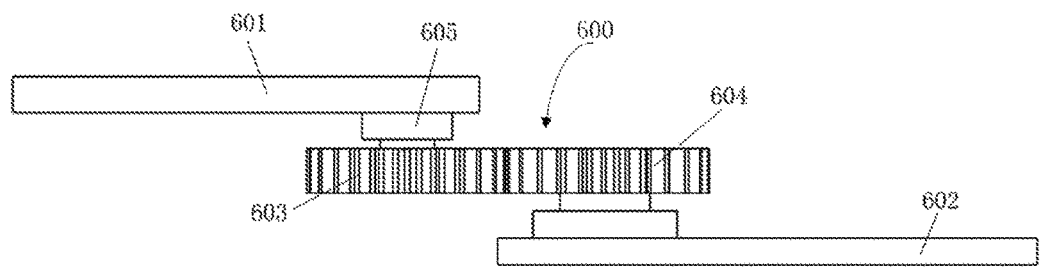
FIG. 9 is a schematic structural diagram of a mechanical arm according to an embodiment of the present invention.
Figure 10:
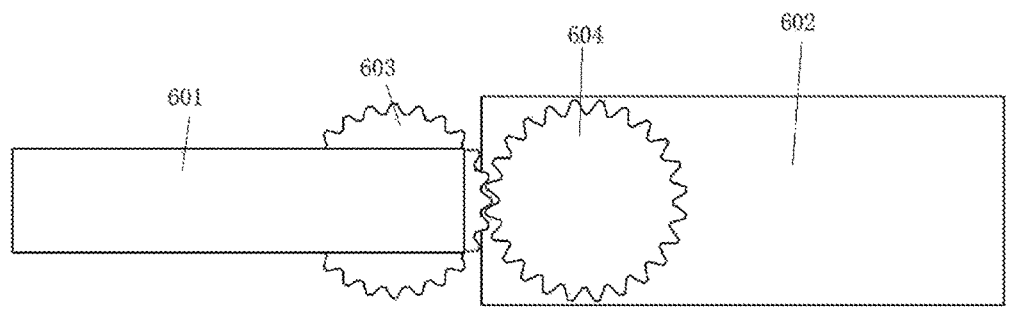
FIG. 10 is a schematic structural diagram, in another direction, of the mechanical aim shown in FIG. 9.

Referring to FIG. 9 and FIG. 10, an embodiment of the present invention provides a mechanical arm 600, including a first rotary arm 601, a second rotary arm 602, a driving mechanism and a motor 605. The driving mechanism is used for transforming a rotation of the motor 605 to a moving of the second rotary arm 602 relative to the first rotary arm 601. In an embodiment of the present invention, the driving mechanism includes a drive gear 603 and a driven gear 604 engaging with the drive gear 603. The motor 605 is disposed on an end, close to the second rotary arm 602, of the first rotary arm 601. A stator of the motor 605 is fixedly connected to the first rotary arm 601. A rotor of the motor 605 is fixedly connected to the drive gear 603, to drive the drive gear 603 to rotate. The driven gear 604 is fixed on an end, close to the first rotary arm 601, of the second rotary arm 602. The driven gear 604 engages with the drive gear 603. When the motor 605 drives the drive gear 603 to rotate, the driven gear 604 rotates along with the drive gear 603, so that the second rotary arm 602 moves relative to the first rotary arm 601.

When both the drive gear 603 and the driven gear 604 are circular, driven by the motor 605, the second rotary arm 602 rotates relative to the first rotary arm 601, as shown in FIG. 10.

When the drive gear 603 is circular and the driven gear 604 is a rack, driven by the motor 605, the second rotary arm 602 performs translational movement relative to the first rotary arm 601.

When the drive gear 603 is a rack and the driven gear 604 is circular, driven by the motor 605, the second rotary arm 602 performs translational movement relative to the first rotary arm 601.

When both the drive gear 603 and the driven gear 604 are racks, driven by the motor 605, the second rotary arm 602 performs translational movement relative to the first rotary arm 601.

This embodiment does not limit shapes of the drive gear 603 and the driven gear 604. The drive gear 603 or the driven gear 604 may alternatively be oval. The second rotary arm 602 moves relative to the first rotary arm 601 based on the shapes of the drive gear 603 and the driven gear 604.

In the present embodiment, the motor 605 is the motor 100 described in the foregoing embodiments.

The mechanical arm 600 may be applied to a robot, a medical instrument, or the like.

Finally, it should be noted that, the foregoing embodiments are used only for describing the technical solutions of the present invention, but not for limiting the technical solutions. According to the idea of the present invention, the foregoing embodiments or technical features in different embodiments may be combined, steps may be performed in any sequence, and there are many other variations, as described above, of different aspects of the present invention. For brevity, they are not described in detail. Although the present invention is described in detail with reference to the foregoing embodiments, persons of ordinary skill in the art should understand that, they may still modify the technical solutions described in the foregoing embodiments, or make equivalent replacements to some technical features thereof, without departing from the scope of the technical solutions of the embodiments of the present invention.

What is claimed is:

1. A motor, comprising:
    a rotary shaft;
    a first magnetic element, wherein the first magnetic element is mounted on the rotary shaft and is capable of rotating with the rotary shaft;
    a first circuit board, wherein the first circuit board is mounted on the rotary shaft and disposed close to the first magnetic element, the first circuit board being opposite to the first magnetic element, the first circuit board being provided with a coil circuit, and the coil circuit being disposed on a surface of the first circuit board facing toward the first magnetic element; and
    a second circuit board, wherein the second circuit board is mounted on the rotary shaft and disposed far away from the first magnetic element, the second circuit board being provided with an electronic speed control circuit, the second circuit board being electrically connected to the first circuit board.

2. The motor according to claim 1 further comprising a first supporting seat sleeved on the rotary shaft, the first supporting seat being capable of rotating with the rotary shaft, wherein the first magnetic element is disposed on the first supporting seat.

3. The motor according to claim 2, wherein the first supporting seat comprises an annular protrude disposed on a middle portion of the first supporting seat, the first magnetic element being sleeved on the annular protrude and connected to the first supporting seat.

4. The motor according to claim 1 further comprising a second supporting seat mounted on the rotary shaft by using a bearing, wherein the first circuit board is mounted on the second supporting seat and connected to the second supporting seat.

5. The motor according to claim 4 further comprising a yoke used for preventing a magnetic line of the first magnetic element diffusing to the second supporting seat, wherein the yoke is disposed on a surface of the second supporting seat facing to the first magnetic element and sandwiched between the first circuit board and the second supporting seat.

6. The motor according to claim 2, wherein the second circuit board is mounted on the second supporting seat and connected to the second supporting seat, the first circuit board and the second circuit board being disposed on two sides of the second supporting seat respectively.

7. The motor according to claim 1, wherein the first circuit board comprises a substrate, the coil circuit being disposed on a surface of the substrate facing to the first magnetic element.

8. The motor according to claim 1, wherein the coil circuit comprises a plurality of rectilinear circuits extending along a radial direction of the first circuit board and arc circuits electrically connected to the plurality of rectilinear circuits, the arc circuits connect the plurality of rectilinear circuits in series to form one phase winding of the motor.

9. The motor according to claim 1 further comprising a second magnetic element, the second magnetic element being mounted on the rotary shaft and being capable of rotating with the rotary shaft, wherein the second circuit board is sleeved on the second magnetic element and the second circuit board is provided with a magnetic encoder for detecting a magnetic field change of the second magnetic element.

10. The motor according to claim 9, wherein the magnetic encoder is disposed close to the second magnetic element, an end face of the magnetic encoder far away from the second circuit board and an end face of the second magnetic element far away from the first magnetic element are on a same plane.

11. The motor according to claim 9, wherein the second magnetic element and the first magnetic element are disposed on two ends of the rotary shaft respectively.

12. The motor according to claim 9 further comprising a nut disposed on an end of the rotary shaft, wherein the second magnetic element is sleeved on the nut and connected to the nut.

13. A camera assembly, comprising:
    a gimbal, and
    a shooting apparatus connected to the gimbal;
    wherein the gimbal comprises:
    a first motor used for driving the shooting apparatus rotating about a yaw axis, the first motor comprising a first stator and a first rotator connected to the first stator, the first rotator being capable of rotating relative to the first stator;
    a second motor used for driving the shooting apparatus rotating about a pitch axis, the second motor comprising a second stator and a second rotator connected to the second stator, the second rotator being capable of rotating relative to the second stator;
    a first connecting arm, one end of the first connecting arm being connected to the first rotator and the other end of the first connecting arm being connected to the second stator;
    a third motor used for driving the shooting apparatus rotating about a roll axis, the third motor comprising a third stator and a third rotator connected to the third stator, the third rotator being capable of rotating relative to the third stator; and
    a second connecting arm, one end of the second connecting arm being connected to the second rotator and the other end of the second connecting arm being connected to the third stator;
    wherein the shooting apparatus is connected to the third rotator;
    wherein at least one of the first motor, the second motor and the third motor comprises:

a rotary shaft;

a first magnetic element, wherein the first magnetic element is mounted on the rotary shaft and is capable of rotating with the rotary shaft;

a first circuit board, wherein the first circuit board is mounted on the rotary shaft and disposed close to the first magnetic element, the first circuit board being opposite to the first magnetic element, the first circuit board being provided with a coil circuit, and the coil circuit being disposed on a surface of the first circuit board facing toward the first magnetic element; and a second circuit board, wherein the second circuit board is mounted on the rotary shaft and disposed far away from the first magnetic element, the second circuit board being provided with an electronic speed control circuit, the second circuit board being electrically connected to the first circuit board.

14. A mechanical arm, comprising:

a first rotary arm;

a motor, the motor being connected to the first rotary arm;

a driving mechanism, the driving mechanism being connected to the motor; and a second rotary arm, the second rotary arm being connected to the driving mechanism;

the driving mechanism being used for transforming a rotation of the motor to a moving of the second rotary arm relative to the first rotary arm;

wherein the motor comprises:

a rotary shaft;

a first magnetic element, wherein the first magnetic element is mounted on the rotary shaft and is capable of rotating with the rotary shaft;

a first circuit board, wherein the first circuit board is mounted on the rotary shaft and disposed close to the first magnetic element, the first circuit board being opposite to the first magnetic element, the first circuit board being provided with a coil circuit, and the coil circuit being disposed on a surface of the first circuit board facing toward the first magnetic element; and a second circuit board, wherein the second circuit board is mounted on the rotary shaft and disposed far away from the first magnetic element, the second circuit board being provided with an electronic speed control circuit, the second circuit board being electrically connected to the first circuit board.

15. The mechanical arm according to claim 14, wherein the driving mechanism comprises a drive gear connected to a rotator of the motor and a driven gear engaging with the drive gear, the driven gear being connected to the second rotary arm.

16. The mechanical arm according to claim 15, wherein the driven gear is a circular gear or a rack.

* * * * *